(12) United States Patent
Sekimoto et al.

(10) Patent No.: US 10,087,533 B2
(45) Date of Patent: ***Oct. 2, 2018

(54) METHOD FOR REDUCING CARBON DIOXIDE AND DEVICE USED THEREFOR

(71) Applicant: Panasonic Intellectual Property Management Co., Ltd., Osaka (JP)

(72) Inventors: Takeyuki Sekimoto, Osaka (JP); Masahiro Deguchi, Osaka (JP); Satoshi Yotsuhashi, Osaka (JP); Hiroshi Hashiba, Osaka (JP); Yuka Yamada, Nara (JP); Shuichi Shinagawa, Kagoshima (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 431 days.

This patent is subject to a terminal disclaimer.

(21) Appl. No.: 14/795,572

(22) Filed: Jul. 9, 2015

(65) Prior Publication Data

US 2016/0060773 A1 Mar. 3, 2016

(30) Foreign Application Priority Data

Aug. 29, 2014 (JP) ................. 2014-175095

(51) Int. Cl.
*C25B 3/04* (2006.01)
*C25B 9/08* (2006.01)
(Continued)

(52) U.S. Cl.
CPC ............. *C25B 3/04* (2013.01); *B01J 19/123* (2013.01); *B01J 19/127* (2013.01); *B01J 19/128* (2013.01); *C25B 1/003* (2013.01); *C25B 9/08* (2013.01)

(58) Field of Classification Search
CPC ... C25B 3/04; C25B 9/08; C25B 1/003; B01J 19/128; B01J 19/127; B01J 19/123
(Continued)

(56) References Cited

U.S. PATENT DOCUMENTS 8,696,883 B2 4/2014 Yotsuhashi et al.
9,598,781 B2 * 3/2017 Deguchi ................. C25B 1/003

FOREIGN PATENT DOCUMENTS

JP 2003-024764 1/2003
JP 2013-091048 5/2013
(Continued)

OTHER PUBLICATIONS

Aryal et al, " Hydrogen generation by solar water splitting using p-InGaN photoelectrochemical cells," Appl. Phys. Lett. 96, 051220 (2010).*

(Continued)

*Primary Examiner* — James Lin
*Assistant Examiner* — Colleen M Raphael
(74) *Attorney, Agent, or Firm* — McDermott Will & Emery LLP (57) ABSTRACT

A method for reducing carbon dioxide is provided. In the present method, used is an anode electrode comprises a stacked structure of a photoelectric conversion layer, a metal layer, and an $In_xGa_{1-x}N$ layer (where $0<x\le1$). The $In_xGa_{1-x}N$ layer is of i-type or n-type. The metal layer is interposed between the photoelectric conversion layer and the $In_xGa_{1-x}N$ layer. When irradiating the anode electrode with light, a first light part included in the light is absorbed by the $In_xGa_{1-x}N$ layer and a second light part included in the light travels through the $In_xGa_{1-x}N$ layer. The second light part is absorbed by the photoelectric conversion layer to generate electric power in the photoelectric conversion layer. The second light part has a longer wavelength than the first light (Continued)

part. The carbon dioxide contained in the first electrolyte solution is reduced on the cathode electrode.

24 Claims, 5 Drawing Sheets

(51) Int. Cl.
*B01J 19/12* (2006.01)
*C25B 1/00* (2006.01)

(58) Field of Classification Search
USPC .......................................................... 205/340
See application file for complete search history.

(56) References Cited

FOREIGN PATENT DOCUMENTS

WO 2006/082801 8/2006
WO 2012/046374 4/2012

OTHER PUBLICATIONS

Song et al, "Improved photovoltaic performance of InGaN single junction solar cells by using n-on-p type device structure," Journal of Optoelectronics and Advanced Materials vol. 12, No. 7, Jul. 2010, p. 1452-1456.*

Kamimura et al, "Photoelectrochemical Properties of (In,Ga)N Nanowires for Water Splitting Investigated by in Situ Electrochemical Mass Spectroscopy," J. Am. Chem. Soc. 2013, 135, 10242-10245.*

King et al, "Surface electronic properties of n- and p-type InGaN alloys," Physica Status Solidi (b) 245, No. 5, 881-883 (2008).*

Parameshwaran et al, "III-V nitride semiconductors for solar hydrogen production," Energy Harvesting and Storage: Materials, Devices, and Applications III, Proc. of SPIE vol. 8377, 83770B • © 2012 SPIE.*

Sawaki et al, "High efficiency InGaN solar cell with a graded p-InGaN top layer," Gallium Nitride Materials and Devices VII, Proc. of SPIE vol. 8262, 826210; © 2012 SPIE.*

Yang et al, "Characteristics of InGaN/sapphire-based photovoltaic devices with different superlattice absorption layers and buffer layers," Gallium Nitride Materials and Devices VI, Proc. of SPIE vol. 7939, 79391J • © 2011.*

Dahal et al, "Realizing InGaN monolithic solar-photoelectrochemical cells for artificial photosynthesis," Applied Physics Letters 104, 143901 (2014).*

Takeyuki Sekimoto et. al., "Tandem photo-electrode of InGaN with two Si p-n junctions for CO2 conversion to HCoOH with the efficiency greater than biological photosynthesis", Applied Physics Letters, vol. 106, 073902 (2015).

\* cited by examiner

METHOD FOR REDUCING CARBON DIOXIDE AND DEVICE USED THEREFOR

BACKGROUND

1. Technical Field

The present invention relates to a method for reducing carbon dioxide and a device used therefor.

2. Description of the Related Art

U.S. Pat. No. 8,696,883 discloses a method for reducing carbon dioxide. In this method, an anode formed of a nitride semiconductor is irradiated with light to reduce carbon dioxide on a cathode electrode. The method disclosed in U.S. Pat. No. 8,696,883 does not need an external power supply such as a solar battery or a potentiostat. In other words, in the method disclosed in U.S. Pat. No. 8,696,883, the energy to be supplied to reduce carbon dioxide is only light.

Japanese Patent Application laid-open Publication No. 2003-024764 discloses a gas generator. In Japanese Patent Application laid-open Publication No. 2003-024764, an anode is irradiated with light to produce a hydrogen gas on a cathode electrode. The anode disclosed therein comprises a first n-type nitride semiconductor layer formed of InGaN, a p-type nitride semiconductor layer formed of GaN, and a second n-type nitride semiconductor layer formed of GaN.

WO 2006/082801 also discloses a gas generator using a nitride semiconductor. In the paragraph 0026 of WO 2006/082801, it is described that the nitride semiconductor may be a stacked structure of plural AlGaInN layers each having a different composition. Furthermore, it is described that the stacked structure is a stacked structure of n-type-p-type-n-type from the front surface side in a case where the nitride semiconductor is used as an anode.

SUMMARY

The present invention provides a method for reducing carbon dioxide, comprising:

(a) preparing a carbon dioxide reduction device comprising:
- a cathode chamber storing a first electrolyte solution containing carbon dioxide;
- an anode chamber storing a second electrolyte solution;
- a proton exchange membrane interposed between the cathode chamber and the anode chamber;
- a cathode electrode that is in contact with the first electrolyte solution and that comprises a metal or a metal compound on the surface thereof; and
- an anode electrode that is in contact with the second electrolyte solution, wherein
the carbon dioxide reduction device does not comprise an external power supply;
the anode electrode comprises a stacked structure of a photoelectric conversion layer, a metal layer, and an $In_xGa_{1-x}$ N layer (where $0<x\leq1$); the $In_xGa_{1-x}N$ layer is of i-type or n-type;
the metal layer is interposed between the photoelectric conversion layer and the $In_xGa_{1-x}N$ layer;
the metal layer covers a part of the photoelectric conversion layer;
the photoelectric conversion layer comprises a first p-type semiconductor layer and a first n-type semiconductor layer;
the first p-type semiconductor layer is electrically connected to the $In_xGa_{1-x}N$ layer; and
the first n-type semiconductor layer is electrically connected to the cathode electrode; and (b) irradiating the anode electrode with light, wherein in the step (b),
a first light part included in the light is absorbed by the $In_xGa_{1-x}N$ layer;
a second light part included in the light travels through the $In_xGa_{1-x}N$ layer;
the second light part is absorbed by the photoelectric conversion layer to generate electric power in the photoelectric conversion layer;
the second light part has a longer wavelength than the first light part; and
the carbon dioxide contained in the first electrolyte solution is reduced on the cathode electrode.

In the method for reducing carbon dioxide according to the present invention, the anode comprises an InGaN layer on the surface thereof, however, carbon dioxide is generated on the cathode.

DETAILED DESCRIPTION OF THE EMBODIMENTS

Hereinafter, a method for reducing carbon dioxide according to the present invention will be described with reference to the drawings.

First Embodiment

Figure 1A:
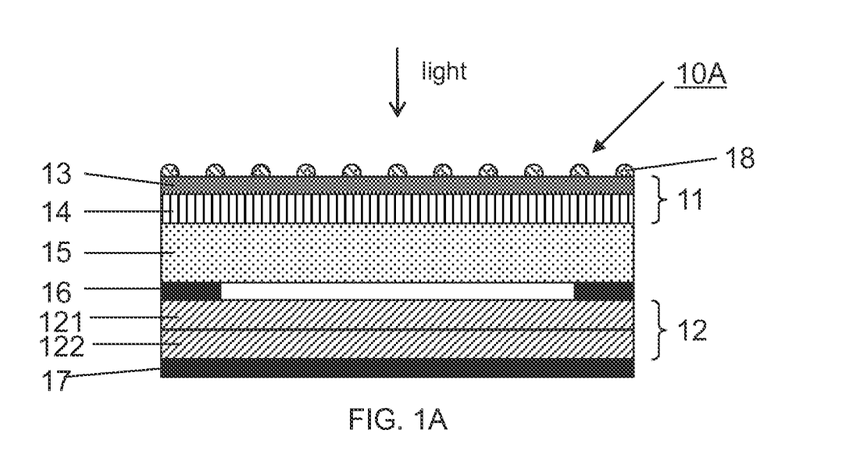
FIG. 1A shows a cross-sectional view of an anode electrode according to a first embodiment.

FIG. 1A shows a cross-sectional view of an anode electrode (i.e., photochemical electrode) used for a method for reducing carbon dioxide according to the first embodiment. The anode electrode 10A shown in FIG. 1A comprises a stacked structure of an $In_xGa_{1-x}N$ layer 13, a metal layer 16, and a photoelectric conversion layer 12. The metal layer 16 is interposed between the $In_xGa_{1-x}N$ layer 13 and the photoelectric conversion layer 12.

The value of x is more than 0. It is desirable that the value of x is not more than 0.40. The $In_xGa_{1-x}N$ layer 13 is of i-type or n-type. The $In_xGa_{1-x}N$ layer 13 must not be of p-type. This is because no electrons are generated in the inside of the $In_xGa_{1-x}N$ layer 13 irradiated with light in case where the $In_xGa_{1-x}N$ layer 13 is of p-type.

It is desirable that the $In_xGa_{1-x}N$ layer 13 is arranged on a GaN layer 14. A first semiconductor layer 11 may include the $In_xGa_{1-x}N$ layer 13 and the GaN layer 14. It is desirable that the first semiconductor layer 11 is epitaxially grown on a conductive substrate 15 such as a GaN substrate, a $Ga_2O_3$ substrate, or a silicon carbide substrate. In other words, it is desirable that both the $In_xGa_{1-x}N$ layer 13 and the GaN layer 14 are formed on the conductive substrate 15 by an epitaxial method. It is desirable that the GaN layer 14 is of i-type or n-type. It is more desirable that the GaN layer 14 is of $n^+$-type, since electrons generated in the inside of the $In_xGa_{1-x}N$ layer 13 migrate to the metal layer 16 easily. In other words, it is desirable that the GaN layer 14 is doped with silicon at a higher concentration than the $In_xGa_{1-x}N$ layer 13. As one example, the $n^+$-type GaN layer 14 doped with silicon has a carrier concentration of not less than $1\times10^{18}/cm^3$. Desirably, the carrier concentration falls within the range of $2\times10^{18}/cm^3$-$8\times10^{18}/cm^3$.

The $In_xGa_{1-x}N$ layer 13 may have a thickness of not less than 70 nanometers and not more than 300 nanometers. Desirably, the $In_xGa_{1-x}N$ layer 13 may have a thickness of not less than 80 nanometers and not more than 150 nanometers.

The photoelectric conversion layer 12 comprises a p-type semiconductor layer 121 and an n-type semiconductor layer 122. The p-type semiconductor layer 121 is interposed between the metal layer 16 and the n-type semiconductor layer 122. The p-type semiconductor layer 121 and the n-type semiconductor layer 122 are in contact with each other to form a pn-junction. The p-type semiconductor layer 121 is connected electrically to the $In_xGa_{1-x}N$ layer 13 through the metal layer 16. Therefore, it is desirable that the p-type semiconductor layer 121 and the metal layer 16 form an ohmic contact. It is desirable that the p-type semiconductor layer 121 and the n-type semiconductor layer 122 are formed of silicon, GaAs, GaP, or Ge. It is more desirable that the p-type semiconductor layer 121 and the n-type semiconductor layer 122 are formed of silicon. In other words, it is desirable that the photoelectric conversion layer 12 is a solar battery formed from a stacked structure of a p-type semiconductor layer and an n-type semiconductor layer each formed of silicon. An i-type semiconductor layer may be interposed between the p-type semiconductor layer 121 and the n-type semiconductor layer 122. The n-type semiconductor layer 122 is electrically connected to a cathode electrode 301 which will be described later.

The anode electrode 10A desirably further comprises a terminal part 17.

The terminal part 17 is arranged on the n-type semiconductor layer 122, and the n-type semiconductor layer 122 may be inserted between the p-type semiconductor layer 121 and the terminal part 17. The terminal part 17 is formed of a transparent conductive material or a metal. An example of the transparent conductive material is zinc oxide, indium tin oxide (hereinafter, referred to as "ITO") or tin oxide. An example of the metal is aluminum, copper, nickel, titanium or silver.

As is described later, water is oxidized on the front surface of the $In_xGa_{1-x}N$ layer 13 to generate oxygen. In order to improve oxygen generation efficiency and durability of the anode electrode 10A, it is desirable that a plurality of nickel oxide particles are arranged on the front surface of the $In_xGa_{1-x}N$ layer 13. Each of the nickel oxide particles is formed of a compound represented by the chemical formula $NiO_y$ ($0<y\leq 1$). Alternatively, it is desirable that a part of the front surface of the $In_xGa_{1-x}N$ layer 13 is covered with a film formed of nickel oxide (hereinafter, referred to as "nickel oxide layer"). Needless to say, the nickel oxide particles or the nickel oxide layer is in contact with the $In_xGa_{1-x}N$ layer 13. The nickel oxide particles or the nickel oxide layer must not prevent the $In_xGa_{1-x}N$ layer 13 from being irradiated with light. For more detail, see U.S. Pat. No. 8,709,228, which is herein incorporated by reference. It is desirable that the nickel oxide layer has a thickness of not less than 10 nanometers. The nickel oxide layer is also formed of a compound represented by the chemical formula $NiO_y$ ($0<y\leq 1$). The nickel oxide layer may cover the whole of the front surface of the $In_xGa_{1-x}N$ layer 13. In this case, water is oxidized on the front surface of the nickel oxide layer to generate oxygen.

Hereinafter, a fabrication method of such an anode electrode 10A will be described. First, the $n^+$-type GaN layer 14 and the $In_xGa_{1-x}N$ layer 13 are epitaxially grown on the conductive substrate 15 such as a GaN substrate. In this way, the first semiconductor layer 11 is formed on the front surface of the conductive substrate 15. The metal layer 16 is formed on the back surface of the conductive substrate 15 by a vacuum deposition method. Then, the conductive substrate 15 and the p-type semiconductor layer 121 included in the photoelectric conversion layer 12 are joined to each other so as to interpose the metal layer 16 therebetween. In this way, the anode electrode 10A shown in FIG. 1A is fabricated.

Figure 2A:
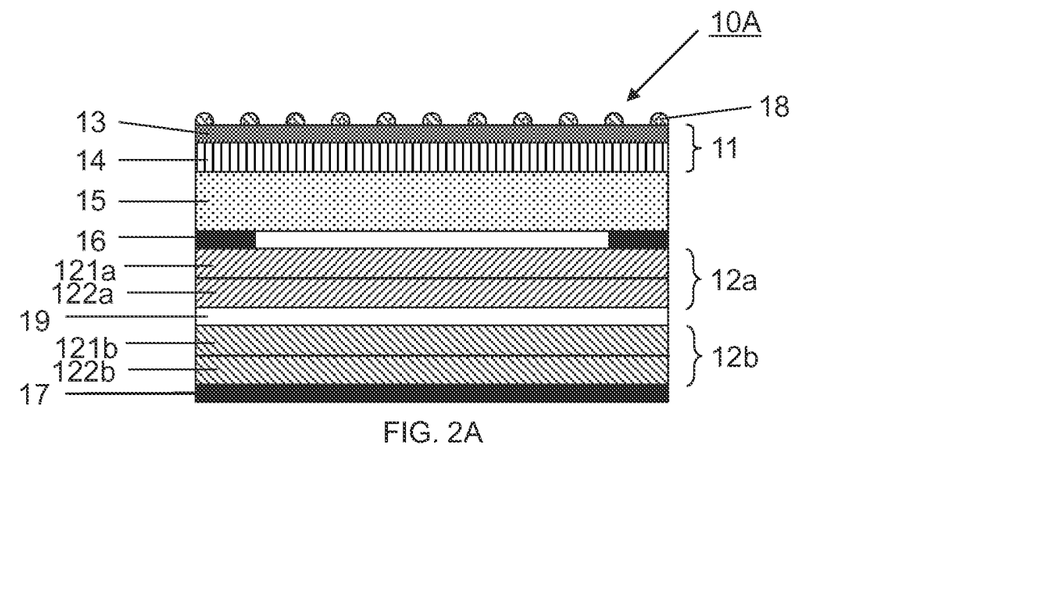
FIG. 2A shows a cross-sectional view of the anode electrode according to the first embodiment in a case of using two photoelectric conversion layers.

As shown in FIG. 2A, the anode electrode 10A may comprise a plurality of photoelectric conversion layers 12. In other words, the anode electrode 10A may comprise a first photoelectric conversion layer 12a and a second photoelectric conversion layer 12b. An n-type semiconductor layer 122a included in the first photoelectric conversion layer 12a is interposed between a p-type semiconductor layer 121a included in the first photoelectric conversion layer 12a and a p-type semiconductor layer 121b included in the second photoelectric conversion layer 12b. The n-type semiconductor layer 122a is electrically connected to the p-type semiconductor layer 121a and the p-type semiconductor layer 121b. Similarly, the p-type semiconductor layer 121b included in the second photoelectric conversion layer 12b is interposed between the n-type semiconductor layer 122a included in the first photoelectric conversion layer 12a and an n-type semiconductor layer 122b included in the second photoelectric conversion layer 12b. The p-type semiconductor layer 121b is electrically connected to the n-type semiconductor layer 122a and the n-type semiconductor layer 122b. The first photoelectric conversion layer 12a and the second photoelectric conversion layer 12b may be in contact with each other. Alternatively, a transparent electrode layer 19 formed of a transparent electrode material may be interposed between the first photoelectric conversion layer 12a and the second photoelectric conversion layer 12b. In place of the transparent electrode layer 19, an intermediate reflection layer 19 formed of a low refractive index material such as silicon oxide may be used. The first photoelectric conversion layer 12a is formed of amorphous silicon and the second photoelectric conversion layer 12b is formed of microcrystalline silicon.

(Carbon Dioxide Reduction Device)

Figure 3:
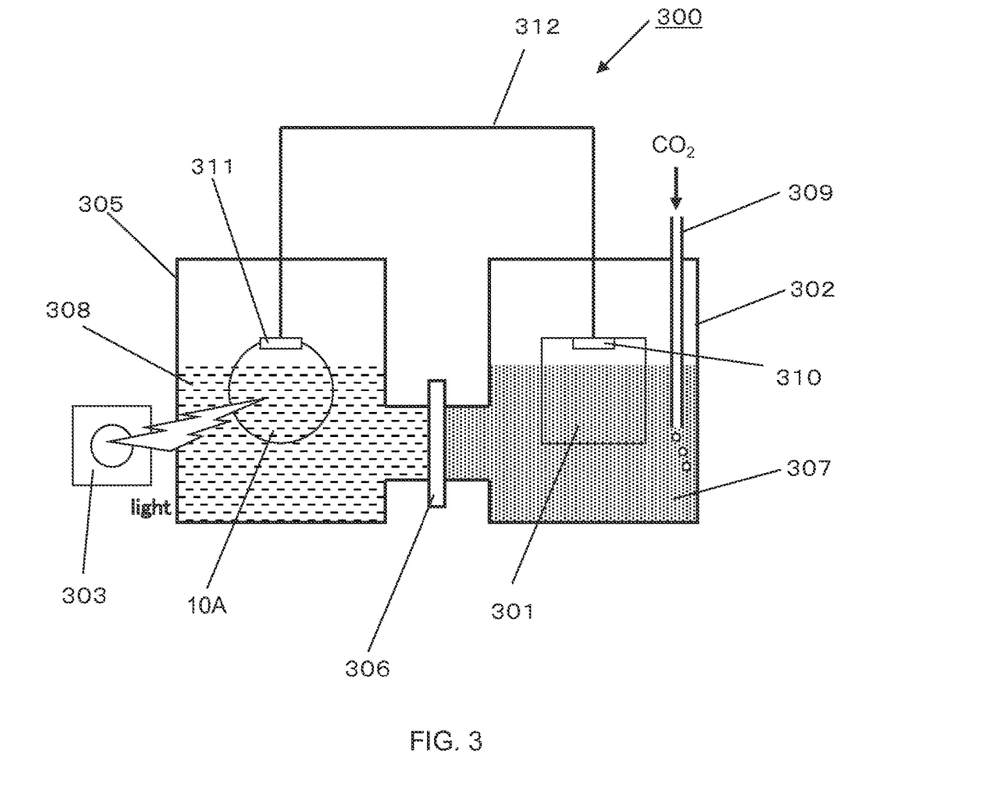
FIG. 3 shows a schematic view of a carbon dioxide reduction device according to the first embodiment.

FIG. 3 shows a schematic view of a carbon dioxide reduction device 300 according to the first embodiment. The carbon dioxide reduction device 300 comprises a cathode chamber 302, an anode chamber 305, and a proton exchange membrane 306. A first electrolyte solution 307 is stored in the cathode chamber 302. The cathode chamber 302 comprises a cathode electrode 301. The cathode electrode 301 is in contact with the first electrolyte solution 307. Specifically, the cathode electrode 301 is immersed in the first electrolyte solution 307.

An example of the first electrolyte solution 307 is a potassium hydrogen carbonate aqueous solution, a sodium hydrogen carbonate aqueous solution, a potassium chloride aqueous solution, or a sodium chloride aqueous solution. Desirably, the first electrolyte solution 307 has a concentration of not less than 1 mol/L. More desirably, the first electrolyte solution 307 has a concentration of not less than 3 mol/L.

The first electrolyte solution 307 further contains carbon dioxide. The concentration of the carbon dioxide contained in the first electrolyte solution 307 is not limited. It is desirable that the first electrolyte solution 307 is acidic in a state where carbon dioxide is dissolved therein.

The cathode electrode 301 has a catalyst layer (not shown) formed of a metal, a metal alloy, or a metal compound on the surface thereof. It is desirable that the catalyst layer contains at least one selected from the group consisting of indium, copper, gold, and silver.

The cathode electrode 301 may be formed only of the catalyst layer. Alternatively, the cathode electrode 301 may comprises a stacked structure of the catalyst layer and a substrate. An example of the substrate is a glass substrate or a glassy carbon substrate. The substrate may have a plurality of catalyst layers each having a shape of a fine particle. As long as the catalyst layer is in contact with the first electrolyte solution 307, only a part of the cathode electrode 301 may be immersed in the first electrolyte solution 307.

A second electrolyte solution 308 is stored in the anode chamber 305. The anode chamber 305 comprises the anode electrode 10A. The anode electrode 10A is in contact with the second electrolyte solution 308. Specifically, the anode electrode 10A is immersed in the second electrolyte solution 308.

An example of the second electrolyte solution 308 is a sodium hydroxide aqueous solution, a potassium hydrogen carbonate aqueous solution, or a sodium hydrogen carbonate aqueous solution. It is desirable that the second electrolyte solution 308 has a concentration of not less than 1 mol/L. A concentration of approximately 5 mol/L is more desirable. It is desirable that the second electrolyte solution 308 is basic.

A region of the anode electrode 10A immersed in the second electrolyte solution 308 is irradiated with light from a light source 303. As will be described later, this light has a first light part to be absorbed by the first semiconductor layer 11 and a second light part to be absorbed by the second semiconductor layer 12. An example of the light source 303 is a xenon lamp, a mercurial lamp, or a halogen lamp. These lamps are used alone. Alternatively, these lamps may be used in combination. Another example of the light source 303 is the sun or a pseudo sun light source.

The proton exchange membrane 306 may be interposed between the cathode chamber 302 and the anode chamber 305 to separate the first electrolyte solution 307 and the second electrolyte solution 308 from each other. In other words, the first electrolyte solution 307 and the second electrolyte solution 308 are not mixed with each other in the carbon dioxide reduction device 300. The proton exchange membrane 306 is not limited, as long as only protons represented by the chemical formula $H^+$ travel through the proton exchange membrane 306 and other materials are prevented from travelling through the proton exchange membrane 306. An example of the proton exchange membrane 306 is a Nafion (registered trademark) film.

The cathode electrode 301 and the anode electrode 10A comprise electrode terminals 310 and 311, respectively. In the first embodiment, the terminal part 17 functions as the electrode terminal 311. These electrode terminals 310 and 311 are electrically connected through a conducting wire 312 without an external power supply such as a potentiostat. In other words, the cathode electrode 301 is electrically connected to the n-type semiconductor layer 122 of the anode electrode 10A through the conducting wire 312 without the external power supply. As just described, the carbon dioxide reduction device according to the first embodiment does not comprise an external power supply.

(Carbon Dioxide Reduction Method)

Next, a method for reducing carbon dioxide using the device mentioned above will be described below.

The carbon dioxide reduction device 300 may be placed at room temperature and under atmospheric pressure. As shown in FIG. 3, the anode electrode 10A is irradiated with the light emitted from the light source 303. Specifically, the $In_xGa_{1-x}N$ layer 13 included in the anode electrode 10A is irradiated with light. As shown in FIG. 1A, the light travels through the $In_xGa_{1-x}N$ layer 13 to the photoelectric conversion layer 12.

The light emitted from the light source 303 has the first light part to be absorbed by the first semiconductor layer 11 and the second light part to be absorbed by the photoelectric conversion layer 12. The second light part travels through the first semiconductor layer 11 without being absorbed by the first semiconductor layer 11. In this way, the light incident on the $In_xGa_{1-x}N$ layer 13 is used effectively. The second light part has a longer wavelength than the first light part. In other words, the wavelength of the first light part to be absorbed by the first semiconductor layer 11 is different from the wavelength of the second light part to be absorbed by the second semiconductor layer 12.

Specifically, the $In_xGa_{1-x}N$ layer 13 absorbs light having a wavelength not more than 625 nanometers in a case where the value of x is 0.4. Therefore, the photoelectric conversion layer 12 absorbs light having a wavelength more than 625 nanometers. In a case where the value of x is 0.1, the $In_xGa_{1-x}N$ layer 13 absorbs light having a wavelength not more than 415 nanometers. Therefore, the photoelectric conversion layer 12 absorbs light having a wavelength more than 415 nanometers. As just described, since the wavelength of the first light part to be absorbed by the first semiconductor layer 11 is different from the wavelength of the second light part to be absorbed by the second semiconductor layer, the light incident on the $In_xGa_{1-x}N$ layer 13 is used effectively.

As shown in FIG. 3, the carbon dioxide reduction device 300 comprises a gas introduction pipe 309. It is desirable that carbon dioxide contained in the first electrolyte solution 307 is reduced while carbon dioxide is supplied to the first electrolyte solution 307 through the gas introduction pipe 309. One end of the gas introduction pipe 309 is immersed in the first electrolyte solution 307. It is desirable to dissolve a sufficient amount of carbon dioxide in the first electrolyte solution 307 by supplying carbon dioxide through the gas introduction pipe 309 prior to starting the reduction of carbon dioxide.

When the $In_xGa_{1-x}N$ layer 13 is irradiated with light, electrons and holes are generated in the $In_xGa_{1-x}N$ layer 13. The holes migrate to the front surface of the anode electrode 10A (i.e., the front surface of the $In_xGa_{1-x}N$ layer 13 of the anode electrode 10A) and oxidize water in contact with the front surface of the anode electrode 10A to generate oxygen. In other words, the anode electrode 10A functions as an electrode for generating oxygen. On the other hand, the electrons migrate toward to the metal layer 16.

The wavelength of the light absorbed by the $In_xGa_{1-x}N$ layer 13 depends on the bandgap width (i.e., the width of the forbidden band) of the $In_xGa_{1-x}N$ layer 13. The bandgap of the $In_xGa_{1-x}N$ layer 13 decreases with an increase in the In composition (i.e., the value of x). The value of x is adjusted in such a way that the $In_xGa_{1-x}N$ layer 13 absorbs light having a wavelength not less than approximately 365 nanometers.

On the other hand, the photoelectric conversion layer 12 does not absorb light at all in case where the $In_xGa_{1-x}N$ layer 13 absorbs all of the light. Furthermore, the crystal quality of the $In_xGa_{1-x}N$ layer 13 may be deteriorated with an increase in the value of x. For this reason, it is desirable that the value of x is not more than 0.4. As described above, the $In_xGa_{1-x}N$ layer 13 absorbs light having a wavelength not more than 625 nanometers in a case where the value of x is 0.4. Therefore, the photoelectric conversion layer 12 absorbs light having a wavelength more than 625 nanometers. It is desirable that the value of x is not less than 0.05 and not more than 0.15.

Similarly, light fails to reach the photoelectric conversion layer 12 in case where the all of the front surface of the photoelectric conversion layer 12 is covered with the metal layer 16. Therefore, a part of the front surface of photoelectric conversion layer 12 is covered with the metal layer 16. The ratio of the area of the metal layer 16 to the front surface area of the photoelectric conversion layer 12 is not limited, as far as the ratio falls within the range of more than 0 and less than 1. However, in a case where the ratio is too large, the photoelectric conversion layer 12 hardly functions, since almost all of the light is blocked by the metal layer 16. For this reason, it is desirable that the ratio is not more than 0.1.

The electrons generated by irradiating the $In_xGa_{1-x}N$ layer 13 with light reach the p-type semiconductor layer 121 through the GaN layer 14, the conductive substrate 15 and metal layer 16.

The second light part is absorbed by the photoelectric conversion layer 12, and holes and electrons are generated also in the photoelectric conversion layer 12. The holes generated in the photoelectric conversion layer 12 recombine with the electrons supplied through the metal layer 16 from the first semiconductor layer 11. However, the electrons generated in the second semiconductor layer 12 travel to the cathode electrode 301 through the terminal part 17. The electric potential applied to the cathode electrode 301 is the sum of the photovoltage generated in the first semiconductor layer 11 and the photovoltage generated in the photoelectric conversion layer 12. In this way, obtained is the electric potential sufficient to reduce carbon dioxide on the surface of the cathode electrode 301. In other words, in case where the anode electrode 10A comprising the $In_xGa_{1-x}N$ layer 13 on the surface thereof is used without the photoelectric conversion layer 12, the electric potential sufficient to reduce carbon dioxide on the surface of the cathode electrode 301 fails to be obtained. See Japanese Patent Application laid-open Publication No. 2003-024764. As disclosed in Japanese Patent Application laid-open Publication No. 2003-024764, in case where no photoelectric conversion layer 12 is used and where the anode electrode 10A comprises InGaN on the surface thereof, carbon dioxide fails to be reduced, and oxygen and hydrogen are generated on the cathode and the anode, respectively. However, since the photoelectric conversion layer 12 is used, in the first embodiment where the anode electrode 10A comprising the $In_xGa_{1-x}N$ layer 13 on the surface thereof is used, the electric potential sufficient to reduce carbon dioxide on the surface of the cathode electrode 301 is obtained.

In this way, in the first embodiment where the anode electrode 10A comprising the $In_xGa_{1-x}N$ layer 13 on the front surface thereof is used, carbon dioxide is reduced on the surface of the cathode electrode 301. As a result, a hydrocarbon such as formic acid, carbon monoxide, methane or ethylene, an alcohol such as ethanol, or an aldehyde is produced on the cathode electrode 301.

The product produced on the cathode electrode 301 depends on the material of the catalyst layer included in the cathode electrode 301. When the material of the catalyst layer is indium, an indium alloy or an indium compound, formic acid is provided. When the material of the catalyst layer is copper, a copper alloy or a copper compound, at least one selected from the group consisting of methane, ethylene, ethanol and acetaldehyde is provided. When the material of the catalyst layer is gold, a gold alloy or a gold compound, carbon monoxide is provided. When the material of the catalyst layer is silver, a silver alloy or a silver compound, carbon monoxide is provided.

Second Embodiment

Figure 1B:
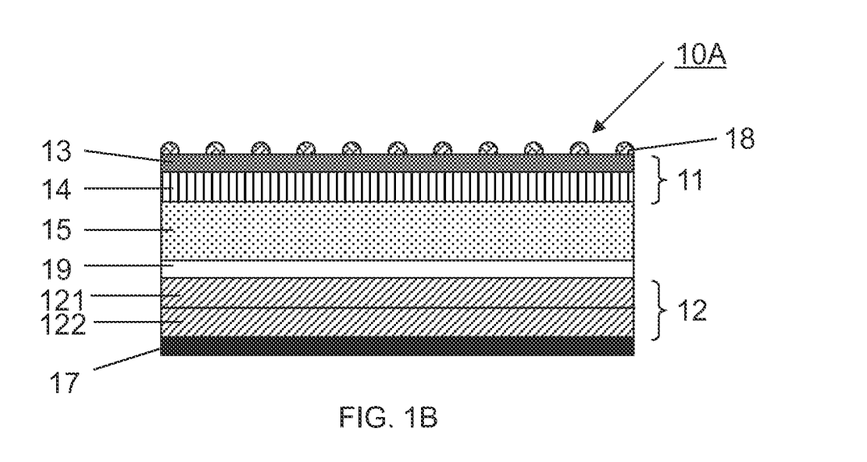
FIG. 1B shows a cross-sectional view of an anode electrode according to a second embodiment.
Figure 2B:
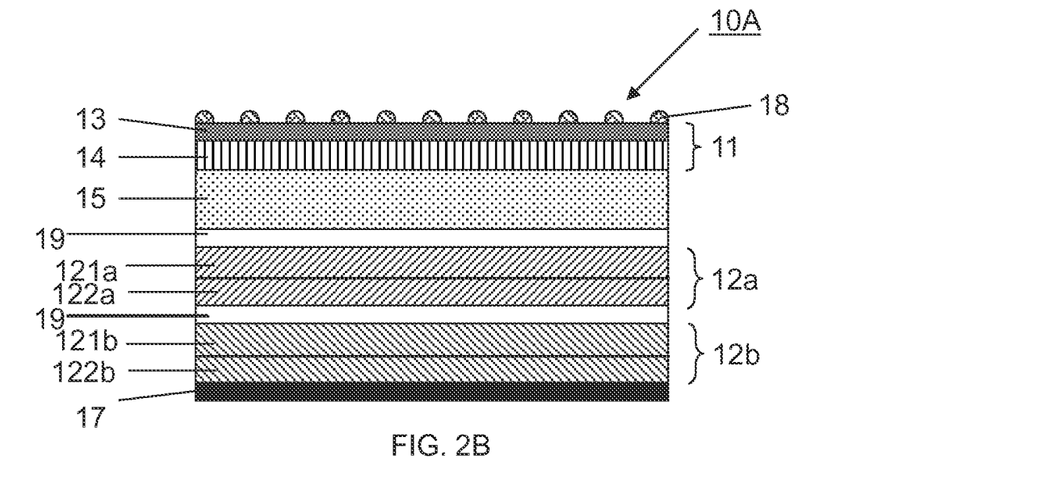
FIG. 2B shows a cross-sectional view of the anode electrode according to the second embodiment in a case of using two photoelectric conversion layers.

In the second embodiment, as shown in FIG. 1B, a transparent electrode layer 19 is used in place of the metal layer 16. Unlike the case shown in FIG. 1A, the transparent electrode layer 19 may cover the whole of the front surface of the photoelectric conversion layer 12. Alternatively, the transparent electrode layer 19 may cover a part of the front surface of the photoelectric conversion layer 12. FIG. 2B shows a cross-sectional view of a case where the anode electrode 10A may comprise plural photoelectric conversion layers 12 in the second embodiment.

EXAMPLES

The present invention will be described in more detail with reference to the following examples.

Inventive Example 1

In the inventive example 1, the anode electrode 10 OA shown in FIG. 2A was used. This anode electrode 1 OA was fabricated as below.

A monocrystalline gallium nitride substrate was prepared as the conductive substrate 15. This conductive substrate had a thickness of approximately 0.4 millimeters and a diameter of approximately 50 millimeters.

Then, the $n^+$-type GaN layer 14 doped with silicon was grown on the front surface of the conductive substrate 15 by an organic metal vapor phase epitaxy method. This $n^+$-type GaN layer 14 had a thickness of 3.0 micrometers and a silicon dope amount of approximately $4.0 \times 10^{18}/cm^3$. The $In_xGa_{1-x}N$ layer 13 (where x=0.05) was grown on the $n^+$-type GaN layer 14 by an organic metal vapor phase epitaxy method.

A plurality of nickel oxide particles 18 were dispersed on the front surface of the $In_xGa_{1-x}N$ layer 13 using a solution reaction. Each of the nickel oxide particles 18 had a size of not less than 20 nanometers and not more than 3 micrometers.

The metal layer 16 was formed on a part of the back surface of the conductive substrate 15. This electrode layer 16 comprised a stacked structure of titanium/aluminum/gold. The electrode layer 16 had a thickness of approximately 500 nanometers.

Aside from this, the first photoelectric conversion layer 12a was joined to the second photoelectric conversion layer 12b. The first photoelectric conversion layer 12a comprised a stacked structure of the first p-type semiconductor layer 121a, a first i-type semiconductor layer (not shown), and the first n-type semiconductor layer 122a each formed of amorphous silicon. The second photoelectric conversion layer 12b comprised a stacked structure of the second p-type semiconductor layer 121b, a second i-type semiconductor layer (not shown), and the second n-type semiconductor layer 122b each formed of microcrystalline silicon. The second n-type semiconductor layer 122a of the first photoelectric conversion layer 12a was brought into contact with the first p-type semiconductor layer 121b of the second photoelectric conversion layer 12b.

Finally, the first p-type semiconductor layer 121a was joined to the conductive substrate 15 so as to interpose the metal layer 16 therebetween. In this way, the anode electrode 10A shown in FIG. 2A was obtained.

On the other hand, an indium substrate was used as the cathode electrode 301. This indium substrate had a thickness of 0.5 millimeters. The indium substrate had a surface oxidation film. First, this surface oxidation film was removed, and subsequently was etched to expose a clean surface of indium.

Using the anode electrode 10A and the cathode electrode 301, the carbon dioxide reduction device 300 shown in FIG. 3 was fabricated. The distance between the anode electrode 10A and the cathode electrode 301 was approximately 8 centimeters. The terminal part 17 of the anode electrode 10A and the electrode terminal 310 of the cathode electrode 301 were electrically connected to each other using the conducting wire 312. The following Table 1 shows details of the first electrolyte solution 307, the second electrolyte solution 308, the proton exchange membrane 306, and the light source 303 used in the inventive example 1.

TABLE 1

| | |
|---|---|
| First electrolyte solution | Potassium hydrogen carbonate aqueous solution having a concentration of 0.5 mol/L |
| Second electrolyte solution | Sodium hydroxide aqueous solution having a concentration of 5.0 mol/L |
| Proton exchange membrane | Nafion film (available from DuPont, trade name; Nafion 117) |
| Light Source | Xenon lamp (Output: 300 W, Area on anode electrode irradiated with light: approximately 9 $cm^2$, Amount of light: Approximately 200 $mW/cm^2$) |

The first electrolyte solution 307 was bubbled for 30 minutes with a carbon dioxide gas supplied through the gas introduction pipe 309. Then, the front surface of the anode electrode 10A (i.e., the front surface of the $In_xGa_{1-x}N$ layer 13) was irradiated with light emitted from the light source 303 through a window (not shown) provided at the anode chamber 305. The light had a wavelength range of not less than 290 nanometers and not more than 840 nanometers. In this way, carbon dioxide was reduced on the cathode electrode 301. The area of the indium substrate immersed in the first electrolyte solution 307 was approximately 13 $cm^2$.

When the $In_xGa_{1-x}N$ layer 13 was irradiated with light, an electric current flowed through the conducting wire 312. When the light irradiation was stopped, no electric current flowed through the conducting wire 312. This means that some kind of reactions occurred due to the light irradiation on the surfaces of the anode electrode 10A and the cathode electrode 301. Then, an amount of electric current (hereinafter, referred to as "reaction current amount") which flows through the conducting wire 312 was measured. Furthermore, the absolute value of the reaction voltage (hereinafter, referred to as "reaction electric potential value") generated by the light irradiation was measured. The measurement results are shown in Table 2.

Figure 4:
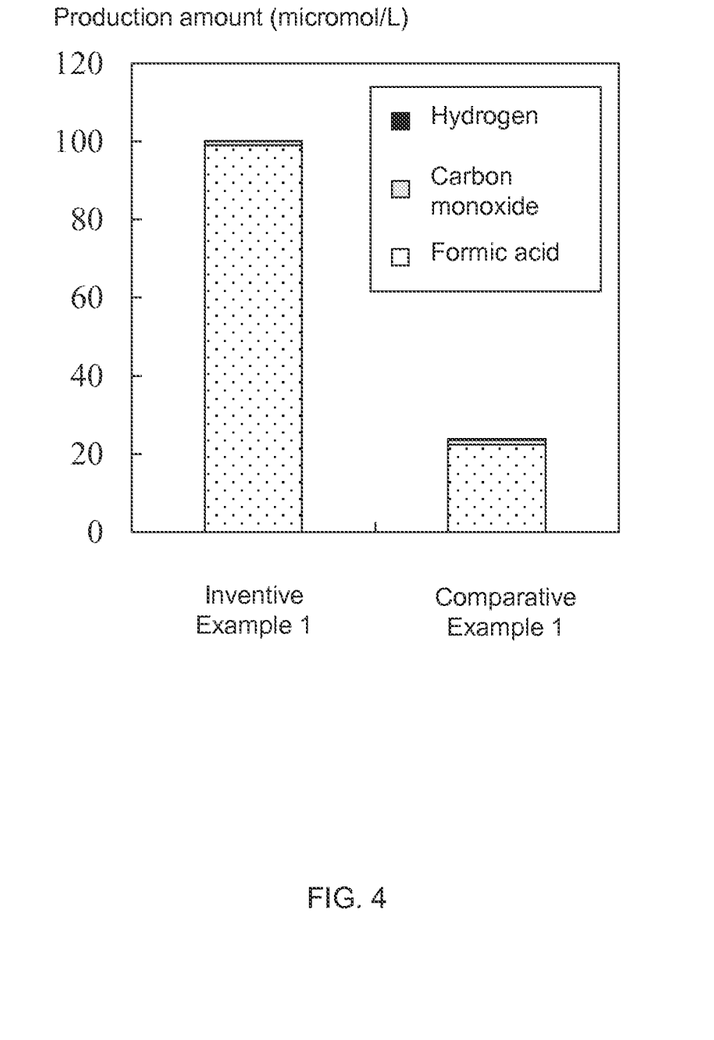
FIG. 4 is a graph showing the results of the inventive example 1 and the comparative example 1.

Then, the reaction products generated through the reduction of carbon dioxide were identified and quantified by gas chromatography and liquid chromatography. The results are shown in FIG. 4.

Comparative Example 1

An experiment similar to the inventive example 1 was conducted, except that an aluminum nitride gallium layer represented by the chemical formula $Al_{0.1}Ga_{0.9}N$ was formed on the GaN layer 14 in place of the $In_xGa_{1-x}N$ layer 13.

TABLE 2

| | Reaction current amount (mA) | Reaction electric potential value (V vs. Ag/AgCl) |
|---|---|---|
| Inventive Example 1 | 11.0 | −1.49 |
| Comparative example 1 | 2.9 | −1.33 |

As is clear from Table 2, the reaction current amount in the inventive example 1 was 3.8 times as high as that of the comparative example 1. This result means that the reaction amount in the inventive example 1 is approximately 3.8 times as large as that of the comparative example 1. The reaction electric potential value in the inventive example 1 was higher than that of the comparative example 1 by 0.16 volts.

As is clear from FIG. 4, formic acid was mainly produced in the cathode chamber 302 in both the inventive example 1 and the comparative example 1. In this way, it was confirmed that carbon dioxide is reduced on the cathode electrode 301 by irradiating the anode electrode 10A with light. A production amount of the formic acid was compared using sun light having an energy of 100 $mW/cm^2$. As a result, the production amount in the comparative example 1 was 22.5 micromol/h, whereas the production amount in the inventive example 1 was 99.0 micromol/h. As just described, it was confirmed that the selectivity of formic acid production is significantly improved and that carbon dioxide is reduced to formic acid efficiently in a short time in the inventive example 1.

Comparative Example 2

An experiment similar to the inventive example 1 was conducted, except that the anode electrode 10A did not have the photoelectric conversion layer 12. However, the reaction current hardly flowed through the conducting wire 312. The reaction product generated on the cathode chamber 302 was hydrogen only. As is clear from the comparative example 2, in order to reduce carbon dioxide only by light irradiation, an energy climb of carriers (i.e., the holes and the electrons) by the photoelectric conversion layer 12 is required.

Inventive Example 2

An experiment similar to the inventive example 1 was conducted, except that a pseudo sun light source having spectra equivalent to that of sun light was used. The ratio (hereinafter, referred to as "energy conversion efficiency") of the energy amount (i.e. the output amount) included in the formic acid generated through the carbon dioxide reduction to the energy amount (i.e. the input amount) of the pseudo sun light incident on the anode electrode 10A was 0.78% in the inventive example 2. The energy conversion efficiency in the comparative example 1 was 0.18%. As just described, the energy conversion efficiency was significantly improved in the inventive example 2.

Inventive Example 3

In the inventive example 3, an experiment similar to the inventive example 1 was conducted, except for the following matters (I)-(IV):

(I) the $In_xGa_{1-x}N$ layer 13 had a thickness of 70 nanometers;

(II) the first electrolyte solution 307 was a potassium chloride aqueous solution having a concentration of 0.5 mol/L;

(III) the cathode electrode 301 was a copper plate having a thickness of 0.5 millimeters; and (IV) the area of the copper plate immersed in the first electrolyte solution 307 was approximately 4 cm$^2$.

In the inventive example 3, it was observed that the reaction electric current was 1.3 times as high as that of the inventive example 1. Furthermore, a hydrocarbon such as methane or ethylene, an alcohol such as ethanol, and an aldehyde such as acetaldehyde were obtained as reduction products of carbon dioxide, besides hydrogen, carbon monoxide, and formic acid.

Figure 5:
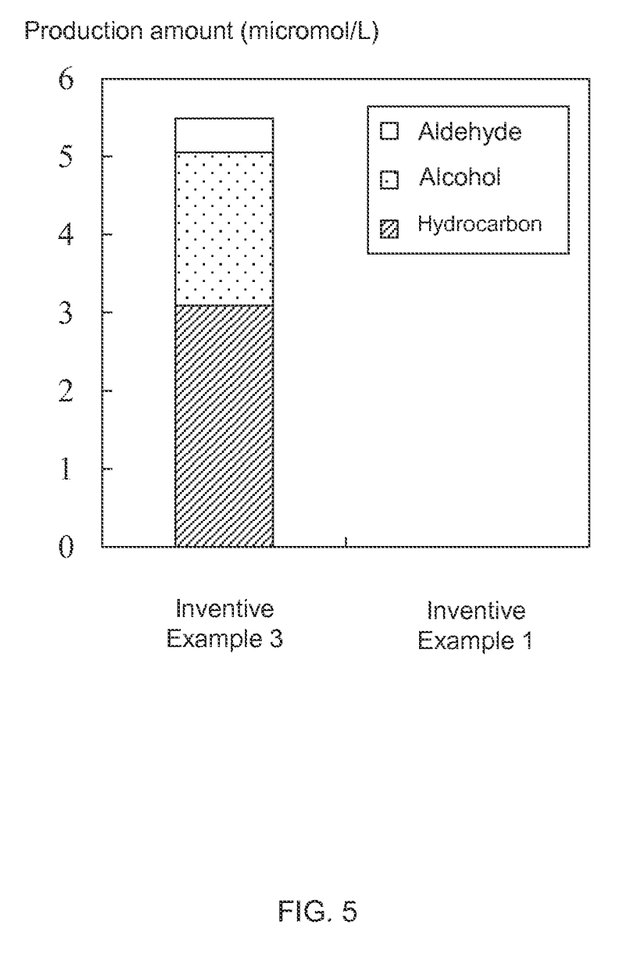
FIG. 5 is a graph showing the results of the inventive example 1 and the inventive example 3.

FIG. 5 shows the production amounts of aldehyde, alcohol, and hydrocarbon in the inventive example 1 and the inventive example 3. As shown in FIG. 5, in the inventive example 1, no aldehyde, alcohol and hydrocarbon were obtained; however, these were obtained in the inventive example 3.

INDUSTRIAL APPLICABILITY

The present invention provides a method for reducing carbon dioxide and a device used therefor in which the anode electrode comprises an InGaN layer on the front surface thereof; however, carbon dioxide is generated on the cathode electrode.

REFERENCE SIGNS LIST

10A Anode electrode
11 First semiconductor layer
12 Second semiconductor layer
13 $In_xGa_{1-x}N$ layer
14 GaN layer
15 Conductive substrate
16 Metal layer
17 Terminal part
18 Nickel oxide particle
19 Transparent electrode layer
300 Carbon dioxide reduction device
301 Cathode electrode
302 Cathode chamber
303 Light source
305 Anode chamber
306 Proton exchange membrane
307 First electrolyte solution
308 Second electrolyte solution
309 Gas introduction pipe
310, 311 Electrode terminal
312 Conducting wire

The invention claimed is:

1. A method for reducing carbon dioxide, comprising:
   (a) preparing a carbon dioxide reduction device comprising:
      a cathode chamber storing a first electrolyte solution containing carbon dioxide;
      an anode chamber storing a second electrolyte solution;
      a proton exchange membrane interposed between the cathode chamber and the anode chamber;
      a cathode electrode that is in contact with the first electrolyte solution and that comprises a metal or a metal compound on the surface thereof; and
      an anode electrode that is in contact with the second electrolyte solution, wherein
   the carbon dioxide reduction device does not comprise an external power supply;
   the anode electrode comprises a stacked structure of a photoelectric conversion layer, a metal layer, and an $In_xGa_{1-x}N$ layer (where 0<x≤1);
   the $In_xGa_{1-x}N$ layer is of i-type or n-type;
   the metal layer is interposed between the photoelectric conversion layer and the $In_xGa_{1-x}N$ layer;
   the metal layer covers a part of the photoelectric conversion layer;
   the photoelectric conversion layer comprises a first p-type semiconductor layer and a first n-type semiconductor layer;
   the first p-type semiconductor layer is electrically connected to the $In_xGa_{1-x}N$ layer; and
   the first n-type semiconductor layer is electrically connected to the cathode electrode; and
   (b) irradiating the anode electrode with light, wherein in the step (b),
   a first light part included in the light is absorbed by the $In_xGa_{1-x}N$ layer;
   a second light part included in the light travels through the $In_xGa_{1-x}N$ layer;
   the second light part is absorbed by the photoelectric conversion layer to generate electric power in the photoelectric conversion layer;
   the second light part has a longer wavelength than the first light part; and
   the carbon dioxide contained in the first electrolyte solution is reduced on the cathode electrode.

2. The method according to claim 1, wherein the light has a wavelength not less than 290 nanometers and not more than 840 nanometers.

3. The method according to claim 2, wherein the light is sunlight.

4. The method according to claim 1, wherein the value of x is not more than 0.4.

5. The method according to claim 4, wherein the value of x is not less than 0.05.

6. The method according to claim 5, wherein the value of x is not more than 0.15.

7. The method according to claim 1, wherein the anode electrode further comprises an n-type GaN layer; and
   the GaN layer is interposed between the $In_xGa_{1-x}N$ layer and the metal layer.

8. The method according to claim 1, wherein the first p-type semiconductor layer is formed of at least one selected from the group consisting of Si, GaAs, GaP, and Ge; and
   the first n-type semiconductor layer is formed of at least one selected from the group consisting of Si, GaAs, GaP, and Ge.

9. The method according to claim 1, wherein
the photoelectric conversion layer further comprises a second p-type semiconductor layer and a second n-type semiconductor layer;
the first n-type semiconductor layer is interposed between the first p-type semiconductor layer and the second p-type semiconductor layer; and
the second p-type semiconductor layer is interposed between the first n-type semiconductor layer and the second n-type semiconductor layer.

10. The method according to claim 1, wherein
the first p-type semiconductor layer and the first n-type semiconductor layer are formed of a different semiconductor from each other.

11. The method according to claim 1, wherein
the stacked structure further comprises a $NiO_y$ particle or a $NiO_y$ layer ($0<y\leq1$); and
the $In_xGa_{1-x}N$ layer is interposed between the $NiO_y$ particle or the $NiO_y$ layer and the metal layer.

12. A carbon dioxide reduction device comprising:
a cathode chamber storing a first electrolyte solution containing carbon dioxide;
an anode chamber storing a second electrolyte solution;
a proton exchange membrane interposed between the cathode chamber and the anode chamber;
a cathode electrode that is in contact with the first electrolyte solution and that comprises a metal or a metal compound on the surface thereof; and
an anode electrode that is in contact with the second electrolyte solution, wherein
the carbon dioxide reduction device does not comprise an external power supply;
the anode electrode comprises a stacked structure of a photoelectric conversion layer, a metal layer, and an $In_xGa_{1-x}N$ layer (where $0<x\leq1$);
the $In_xGa_{1-x}N$ layer is of i-type or n-type;
the metal layer is interposed between the photoelectric conversion layer and the $In_xGa_{1-x}N$ layer;
the metal layer covers a part of the photoelectric conversion layer;
the photoelectric conversion layer comprises a first p-type semiconductor layer and a first n-type semiconductor layer;
the first p-type semiconductor layer is electrically connected to the $In_xGa_{1-x}N$ layer; and
the first n-type semiconductor layer is electrically connected to the cathode electrode.

13. A method for reducing carbon dioxide, comprising:
(a) preparing a carbon dioxide reduction device comprising:
a cathode chamber storing a first electrolyte solution containing carbon dioxide;
an anode chamber storing a second electrolyte solution;
a proton exchange membrane interposed between the cathode chamber and the anode chamber;
a cathode electrode that is in contact with the first electrolyte solution and that comprises a metal or a metal compound on the surface thereof; and
an anode electrode that is in contact with the second electrolyte solution, wherein
the carbon dioxide reduction device does not comprise an external power supply;
the anode electrode comprises a stacked structure of a photoelectric conversion layer, a transparent electrode layer, and an $In_xGa_{1-x}N$ layer (where $0<x\leq1$);
the $In_xGa_{1-x}N$ layer is of i-type or n-type;
the transparent electrode layer is interposed between the photoelectric conversion layer and the $In_xGa_{1-x}N$ layer;
the photoelectric conversion layer comprises a first p-type semiconductor layer and a first n-type semiconductor layer;
the first p-type semiconductor layer is electrically connected to the $In_xGa_{1-x}N$ layer; and
the first n-type semiconductor layer is electrically connected to the cathode electrode; and
(b) irradiating the anode electrode with light, wherein in the step (b),
a first light part included in the light is absorbed by the $In_xGa_{1-x}N$ layer;
a second light part included in the light travels through the $In_xGa_{1-x}N$ layer;
the second light part is absorbed by the photoelectric conversion layer to generate electric power in the photoelectric conversion layer;
the second light part has a longer wavelength than the first light part; and
the carbon dioxide contained in the first electrolyte solution is reduced on the cathode electrode.

14. The method according to claim 13, wherein
the light has a wavelength not less than 290 nanometers and not more than 840 nanometers.

15. The method according to claim 14, wherein
the light is sunlight.

16. The method according to claim 13, wherein
the value of x is not more than 0.4.

17. The method according to claim 16, wherein
the value of x is not less than 0.05.

18. The method according to claim 17, wherein
the value of x is not more than 0.15.

19. The method according to claim 13, wherein
the anode electrode further comprises an n-type GaN layer; and
the GaN layer is interposed between the $In_xGa_{1-x}N$ layer and the transparent electrode layer.

20. The method according to claim 13, wherein
the first p-type semiconductor layer is formed of at least one selected from the group consisting of Si, GaAs, GaP, and Ge; and
the first n-type semiconductor layer is formed of at least one selected from the group consisting of Si, GaAs, GaP, and Ge.

21. The method according to claim 13, wherein
the photoelectric conversion layer further comprises a second p-type semiconductor layer and a second n-type semiconductor layer;
the first n-type semiconductor layer is interposed between the first p-type semiconductor layer and the second p-type semiconductor layer; and
the second p-type semiconductor layer is interposed between the first n-type semiconductor layer and the second n-type semiconductor layer.

22. The method according to claim 13, wherein
the first p-type semiconductor layer and the first n-type semiconductor layer are formed of a different semiconductor from each other.

23. The method according to claim 13, wherein
the stacked structure further comprises a $NiO_y$ particle or a $NiO_y$ layer ($0<y\leq1$); and
the $In_xGa_{1-x}N$ layer is interposed between the $NiO_y$ particle or the $NiO_y$ layer and the transparent electrode layer.

24. A carbon dioxide reduction device comprising:
a cathode chamber storing a first electrolyte solution containing carbon dioxide;
an anode chamber storing a second electrolyte solution;
a proton exchange membrane interposed between the cathode chamber and the anode chamber;
a cathode electrode that is in contact with the first electrolyte solution and that comprises a metal or a metal compound on the surface thereof; and
an anode electrode that is in contact with the second electrolyte solution, wherein
the carbon dioxide reduction device does not comprise an external power supply;
the anode electrode comprises a stacked structure of a photoelectric conversion layer, a transparent electrode layer, and an $In_xGa_{1-x}N$ layer (where $0<x\leq 1$);
the $In_xGa_{1-x}N$ layer is of i-type or n-type;
the transparent electrode layer is interposed between the photoelectric conversion layer and the $In_xGa_{1-x}N$ layer;
the photoelectric conversion layer comprises a first p-type semiconductor layer and a first n-type semiconductor layer;
the first p-type semiconductor layer is electrically connected to the $In_xGa_{1-x}N$ layer; and
the first n-type semiconductor layer is electrically connected to the cathode electrode.

* * * * *